United States Patent [19]

Takeuchi et al.

[11] Patent Number: 5,264,488
[45] Date of Patent: Nov. 23, 1993

[54] MEDICAL DEVICE

[75] Inventors: Motokazu Takeuchi; Yasuo Toyama; Takumi Miyachi, all of Chuo; Shuzo Yamashita; Shinichi Kora, both of Ashigarakami, all of Japan

[73] Assignee: Terumo Kabushiki Kaisha, Tokyo, Japan

[21] Appl. No.: 827,447

[22] Filed: Jan. 29, 1992

[30] Foreign Application Priority Data

Jan. 30, 1991 [JP] Japan .................................. 3-27776
Feb. 25, 1991 [JP] Japan .................................. 3-50137

[51] Int. Cl.$^5$ ..................... C08L 53/02; C08L 23/02; C08L 23/10; C08L 23/16
[52] U.S. Cl. ........................ 525/89; 525/88; 525/98; 525/99; 525/240
[58] Field of Search ............ 525/89, 88, 98, 99, 525/240; 428/462, 500

[56] References Cited

U.S. PATENT DOCUMENTS 4,491,648 1/1988 Durben et al. .................. 525/89

FOREIGN PATENT DOCUMENTS 0330151 8/1989 European Pat. Off. .
2-133406 11/1988 Japan .
3-128957 4/1990 Japan .
2090840 7/1982 United Kingdom .

*Primary Examiner*—James J. Seidleck
*Assistant Examiner*—W. R. H. Clark
*Attorney, Agent, or Firm*—Burns, Doane, Swecker & Mathis

[57] ABSTRACT

A medical device produced by molding a composition comprising (I) 10 to 50% by weight of a polyolefin resin (II) 1 to 89% by weight of a hydrogenated diene polymer obtained by hydrogenating not less than 90 mol % of a butadiene moiety of a linear or branched copolymer consisting of a polybutadiene block segment (C) having a 1,2-vinyl bond content of not more than 20 mol % and a block segment (D) of either polybutadiene or a vinyl aromatic compound-butadiene copolymer whose butadiene moiety has a 1,2-vinyl bond content in the range of from 25 to 95 mol % and having a block structure represented by C-(D-C)$_n$ or (C-D)$_m$, wherein n stands for an integer of at least 1 and m for an integer of at least 2, and (III) 1 to 89% by weight of at least one member selected from the group consisting of (i) a block copolymer composed of a polymer block having a vinyl aromatic compound as a main component thereof and a polymer block having a conjugate diene compound as a main component thereof, (ii) a hydrogenated random copolymer of a vinyl aromatic compound and a conjugated diene compound, and (iii) a hydrogenated block copolymer composed of a polymer block having a vinyl aromatic compound as a main component thereof and a polymer block having a conjugate diene compound as a main component thereof, wherein the sum of (1)+(R)+(III) is 100% by weight.

7 Claims, 1 Drawing Sheet

MEDICAL DEVICE

BACKGROUND OF THE INVENTION

1. Field of the Invention

This invention relates to medical devices such as blood bags and medical tubes which excel in heat resistance, mechanical strength, transparency, and flexibility and exhibit truly ideal oxygen permeability.

2. Description of the Prior Art

Heretofore, such medical devices as blood bags and medical tubes have been produced of flexible vinyl chloride resins containing a phthalic ester plasticizer. These blood bags and medical tubes made of such flexible vinyl chloride resins degrade the function of blood because the phthalic ester plasticizer exudes from the wall of bag or tube into the blood under treatment. Recently, the demand has grown for protracted preservation of platelets. The flexible vinyl chloride resin, however, has no sufficient oxygen permeability. When the blood bag made of this flexible vinyl chloride resin is used for holding a suspension containing platelets in a high concentration, therefore, the platelets often encounter shortage of oxygen supply and eventually suffer irreversible loss of function. Further, since the flexible vinyl chloride resins are deficient in mechanical strength, the blood bags and the medical tubes made of the flexible vinyl chloride resins, while in service, are liable to sustain deformation and breakage and betray inconvenience of handling.

An object of this invention is, therefore, to provide novel medical devices.

Another object of this invention is to provide such medical devices as blood bags and medical tubes which are excellent in oxygen permeability, heatresistance, mechanical strength, transparency, and flexibility and incapable of degrading the function of blood.

SUMMARY OF THE INVENTION

The objects described above are accomplished by a medical device produced by molding a composition comprising (I) 10 to 50% by weight of a polyolefin resin, (II) 1 to 89% by weight of a hydrogenated diene polymer obtained by hydrogenating not less than 90 mol % of a butadiene moiety of a linear or branched blocked copolymer comprising a polybutadiene block segment (C) having a 1,2-vinyl bond content of not more than 20 mol % and a block segment (D) of either polybutadiene or a vinyl aromatic compound-butadiene copolymer whose butadiene moiety has a 1,2-vinyl bond content in the range of from 25 to 95 mol % and having a block structure represented by $C-(D-C)_n$ or $(C-D)_m$, wherein n is an integer of at least 1 and m is an integer of at least 2, and (III) 1 to 89% by weight of at least one member selected from the group consisting of (i) a block copolymer consisting of a polymer block having a vinyl aromatic compound as a main component thereof and a polymer block having a conjugate diene compound as a main component thereof, (ii) a hydrated random copolymer comprising a vinyl aromatic compound and a conjugate diene compound, and (iii) a hydrated block copolymer comprising a polymer block having a vinyl aromatic compound as a main component thereof and a polymer block having a conjugate diene compound as a main component thereof. The wt % of the component (F1 + the wt % of the component (II) + the wt of the component (III) = 100 wt %.

The medical devices such as blood bags and medical tubes which are made of the molding material of this invention excel in heatresistances, mechanical strength, transparency, and flexibility as well as in oxygen permeability to and, therefore, permit protracted preservation of blood and prove to be very highly effective in the medical field.

EXPLANATION OF PREFERRED EMBODIMENT

Figure 1:
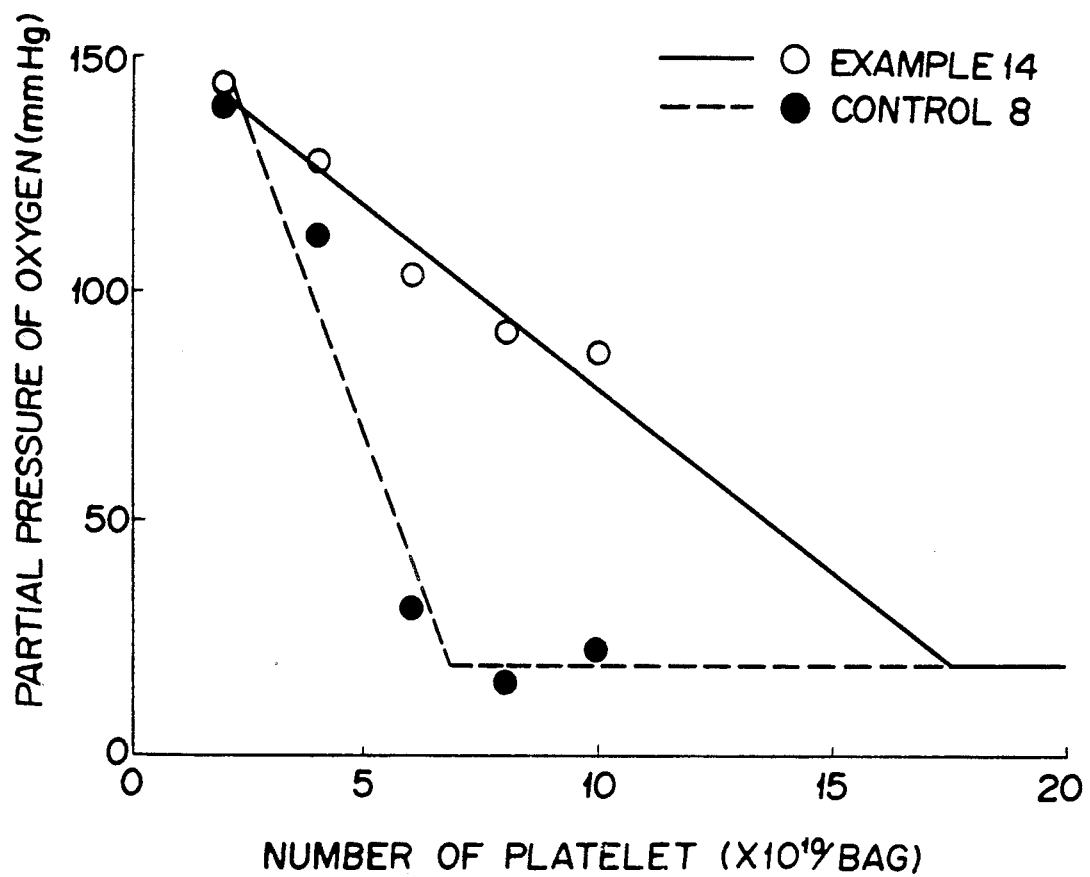
FIG. 1 is a diagram showing the relation between number of blood platelets and the partial pressure of oxygen.

The polyolefin resin to be used in this invention (hereinafter referred to as "component (I)") is a resin which is produced by polymerizing at least one monoolefin by the high pressure method or the low pressure method.

The monoolefins which are effectively usable herein include ethylene, propylene, 1-butene, 1-pentene, 1-hexene, 4-methyl-1-pentene, 2-methyl-1-propene, 3-methyl-1-pentene, 5-methyl-1-hexene, and mixtures thereof. Among other monoolefins cited above, ethyele, propylene, and 4-methyl-1-pentene prove desirable and propylene proves particularly preferable.

Preferable polyolefin resins (component (I)) are polyethylene, polypropylene, and poly-4-methyl-1-pentene. The components (I) of copolymer type include copolymers of polypropylene severally with ethylene, 1-butene, 1-pentene, 1-hexene, 4-methyl-1-pentene, 2-methyl-1-propene, 3-methyl-1-pentene, and 5-methyl-1-hexane, for example. Preferred components (I) are polypropylene and the aforementioned copolymers of polypropylene.

The hydrogenated diene type polymer to be used in this invention (hereinafter referred to as "component (II)") is obtained by hydrogenating not less than 90 mol % of a butadiene moiety of a linear or branched blocked copolymer comprising a polybutadiene block segment (C) having a 1,2-vinyl bond content of not more than 20 mol % and a block segment (D) of either polybutadiene or a vinyl aromatic compound-butadiene copolymer whose butadiene moiety has a 1,2-vinyl bond content in the range of from 25 to 95 mol % and having a block structure represented by $C-(D-C)_n$ or $(C-D)_m$, wherein n is an integer of at least 1 and m is an integer of at least 2.

The block C in the component (II), on being hydrogenated, is transformed into a crystalline block segment showing a structure similar to that of an ordinary low-density polyethylene (LDPE). Though the content of the 1,2-vinyl form in the block C is generally not more than 20 mol %, it is preferable to be not more than 18 mol %, preferably not more than 15 mol %.

If the 1,2-vinyl form of the block C exceeds 20 mol %, the disadvantage arises that the crystal melting point falls notably after the hydrogenation and the dynamic properties of the component (II) are short of satisfaction.

The block D is either polybutadiene or a vinyl aromatic compound-butadiene copolymer and, on being hydrogenated, is transformed into a block segment showing a structure similar to that of a rubbery ethylene-butene copolymer or a vinyl aromatic compound-ethylene-butene copolymer.

The vinyl aromatic compounds which are effectively usable for the block D include styrene, t-butyl styrene, α-methyl styrene, p-methyl styrene, divinyl benzene, 1,1-diphenyl styrene, N,N-diethyl-p-aminoethyl styrene, N,N-diethyl-p-aminoethyl styrene, and vinyl pyridine, for example. Among other vinyl aromatic compounds cited above, styrene and α-methyl styrene prove to be particularly preferable. The amount of the vinyl aromatic compound to be used is not more than 35% by weight, preferably not more than 30% by weight, and more preferably not more than 25% by weight. If this amount exceeds 35% by weight, the disadvantage ensues that the glass transition point of the block D is unduly high and the dynamic properties of the component (II) are unduly low.

The content of the 1,2-vinyl form in the butadiene moiety of the block D is generally in the range of from 25 to 95 mol %, preferably from 25 to 75 mol %, and more preferably from 25 to 55 mol %. If this content is less than 25 mol % or more than 95 mol %, there arises the disadvantage that the block D shows a crystalline structure and assumes a resinous quality owing respectively to a polyethylene chain and a polybutene-1 chain and the dynamic properties of the component (II) are unduly low.

The proportions of the block C and the block D constituting the component (II) are generally 5 to 90% by weight of the block C and 95 to 10% by weight of the block D, preferably 10 to 85% by weight of the block C and 90 to 15% by weight of the block D. If the proportion of the block C is less than 5% by weight and that of the block D is more than 95% by weight, the disadvantage arises that the amount of the crystalline block segment is insufficient and the dynamic properties of the component (II) are poor. If the proportion of the block C is more than 90% by weight and that of the block D is less than 10% by weight, the disadvantage arises that the hardness of the component (II) is unduly high and the produced molding material is unfit for blood bags and medical tubes.

The hydrogenated diene type polymer to be used in this invention {component (II)} must be in a form saturated in advance by having at least 90 mol %, preferably 95 to 100 mol %, of the double bond of the butadiene moiety of the block C and the block D hydrogenated. If the proportion to be hydrogenated is less than 90 mol %, the disadvantage arises that the hydrogenated diene type polymer is deficient in heatresistance, weatherability, and proofness against ozone.

The weight average molecular weight of the block C and the block D is generally not less than 5,000, preferably not less than 10,000 and more desirably not less than 15,000.

If this molecular weight is less than 5,000, the disadvantage arises that the component (II) is deficient in dynamic properties.

The hydrogenated diene polymer {component (II)} is obtained by subjecting the block C and the block D to living anion polymerization in an organic solvent thereby producing a block copolymer and hydrogenating this block copolymer.

The organic solvents which are effectively usable for the living anion polymerization include such hydrocarbon solvents as pentane, hexane, heptane, octane, methyl cyclopentane, cyclohexane, benzene, and xylene, for example.

As the organic alkali metal compound to be used as a polymerization initiator, organic lithium compounds prove to be preferable. The organic lithium compounds which are effectively usable herein include organic monolithium compounds, organic dilithium compounds, and organic polylithium compounds. As typical examples of these organic lithium compounds, ethyl lithium, n-propyl lithium, isopropyl lithium, n-butyl lithium, sec-butyl lithium, t-butyl lithium, hexamethylene dilithium, butadienyl lithium, and isoprenyl dilithium can be cited. The organic alkali metal compound as a polymerization initiator is used in an amount in the range of from 0.02 to 0.2 part by weight, based on 100 parts by weight of the monomer.

In this case, a Lewis base such as, for example, ether or amine is used as an agent for adjusting the microstructure, specifically the vinyl bond content of the conjugate diene moiety. Specifically, the Lewis bases which are effectively usable herein include diethyl ether, tetrahydrofuran, propyl ether, butyl ether, higher ethers, ether derivatives of polyethylene glycol such as ethylene glycol dibutyl ether, diethylene glycol dimethyl ether, diethylene glycol butyl ether, and triethylene glycol dimethyl ether, and tertiary amines such as tetramethyl ethylene diamine, pyridine, and tributyl amine, for example.

The polymerization reaction is carried out at a temperature generally in the range of from −30° C. to 150° C. During the polymerization, the temperature may be controlled at a constant level or allowed to rise spontaneously by avoiding removal of the heat of reaction.

Though the block copolymer may be produced by any method available at all, the production is generally effected by first polymerizing the block C in the aforementioned organic solvent by the use of the aforementioned alkali metal compound as a polymerization initiator and then polymerizing the block D.

The block copolymer which is obtained as described above may be transformed by the addition thereto of a coupling agent into a block copolymer having the polymer molecular chain extended or branched as represented by the following general formula.

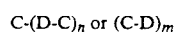

C-(D-C)$_n$ or (C-D)$_m$ wherein n is an integer of at least 1, preferably 2 to 4, and m is an integer of at least 2, preferably 2 to 4.

The coupling agents which are effectively usable herein include diethyl adipate, divinyl benzene, tetrachloro silicon, butyl trichloro silicon, tetrachloro tin, butyl trichloro tin, dimethyl chloro silicon, tetrachloro germanium, 1,2-dibromoethane, 1,4-chloromethyl benzene, bis(trichlorosylyl) ethane, epoxidized linseed oil, trilene diisocyanate, and 1,2,4-benzene triisocyanate, for example.

The combined content of the vinyl aromatic compound in the block copolymer is adjusted by controlling the amounts of monomers supplied for polymerization at different stages and the combined amount of vinyl in the conjugate diene compound is adjusted by suitably varying the amount of the aforementioned microadjusting agent. The weight average molecular weight is adjusted by varying the amount of a polymerization initiator such as, for example, n-butyl lithium.

The method for the production of the block copolymer to be used in this invention will be described more specifically. The block copolymer is obtained by polymerizing 1,3-butadiene in the first stage in an organic solvent like cyclohexane as a polymerization solvent under a vacuum or under a current of nitrogen gas of high purity in the presence of an organic lithium compound like sec-butyl lithium as an initiator thereby giving rise to a low vinyl polybutadiene block destined to form the block C, subsequently adding thereto a microadjusting agent such as tetrahydrofuran or diethyl ether and 1,3-butadiene for the second stage thereby completing the polymerization, and thereafter adding thereto a calculated amount of a coupling agent like dimethyl dichlorosilane thereby coupling a C-D diblock polymer and consequently obtaining a triblock polymer formed of C-D-C.

In this case, a branched multiblock polymer having a plurality of C-D blocks after the pattern of branches is obtained by using a poly-functional coupling agent.

Here, the molecular weight of the block C can be determined by sampling a suitable amount of the polymerization solution at the end of the first stage and analyzing the sample by gel permeation chromatography (GPC). Similarly, the molecular weight of the product of the second stage can be determined by sampling the product of the second state, analyzing the sample by GPC thereby finding the molecular weight of the product of the second stage, and deducting this molecular weight from the molecular weight of the product of the first stage. The molecular weight of the block D in the case of the C-D-C triblock polymer is twice the molecular weight of the product of the second stage obtained by the GPC analysis.

The hydrogenated diene type polymer to be used in this invention is obtained by subjecting the block copolymer produced as described above to hydrogenation.

The hydrogenated diene type copolymer to be used in this invention is obtained by dissolving the block copolymer obtained as described above in an inactive solvent and subjecting the resultant solution to hydrogenation at a temperature in the range of from 20° to 150° C., preferably under a hydrogen pressure in the range of from 1 to 100 kgf/cm$^2$ in the presence of a hydrogenation catalyst.

The block copolymer which constitutes itself the component (i) of the component (II) contains a vinyl aromatic compound in a concentration of from 5 to 95% by weight, preferably from 10 to 90% by weight, and particularly preferably from 15 to 70% by weight. The structure of this block copolymer is not particularly restricted but may be linear, branched, or radial. Specifically, the structures which the block copolymer is allowed to assume include those represented by the general formulas, (A-B)n, (A-B)n-A, and (A-B)$_n$-X, wherein A is a polymer block having an aromatic vinyl compound as a main component thereof, B is a polymer block having a conjugate diene compound as a main component thereof, n is an integer of at least 1, and X is a coupling residue, for example.

The polymer block A having a vinyl aromatic compound as a main component thereof is such that the vinyl aromatic compound block thereof is formed solely of a vinyl aromatic compound or of a copolymer block structure of a vinyl aromatic compound and a conjugate diene compound containing not less than 60% by weight, preferably not less than 80% by weight, of the vinyl aromatic compound.

The polymer block B having a conjugate compound as a main component thereof is such that the conjugate diene compound block thereof is formed solely of a conjugate diene compound or of a copolymer block of a conjugate diene compound and a vinyl aromatic compound containing at least 60% by weight, preferably 80% by weight, of the conjugate diene compound, providing that the vinyl aromatic compound is randomly bonded to the conjugate diene compound or is possessed of a structure containing at least one gradually growing so-called tapered block.

The vinyl aromatic compounds which are effectively usable herein are the same as those cited above as usable for the aforementioned block D.

The conjugate diene compounds which are effectively usable herein include 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene, substituted linear conjugate pentadienes, and linear and side-chain conjugate hexadiene, for example. Among other conjugate diene compounds mentioned above, 1,3-butadiene and 2-methyl-1,3-butadiene prove to be particularly preferable.

The hydrogenated random copolymer of the component (ii) and the hydrogenated block copolymer of a vinyl aromatic compound and a conjugate diene compound of the component (iii) each contain a vinyl aromatic compound in a concentration of not more than 50% by weight, preferably from 5 to 40% by weight.

The random copolymers or block copolymers which are effectively usable for the formation of the components (ii) and (iii) in consequence of hydrogenation include diene type polymers having backbones of the following general formulas:

| | |
|---|---|
| (1) | A—B, |
| (2) | A—B—A, |
| (3) | A—B—E, |
| (4) | A—B$_1$—B$_2$, wherein vinyl bond of B$_1$ is preferably not less than 20% and vinyl bond of B$_2$ is preferably less than 20%, |
| (5) | B, |
| (6) | A/B, |
| (7) | A—A/B, |
| (8) | A—A/B—E, |
| (9) | A—A/B—A, |
| (10) | E—B, |
| (11) | E—B—E, |
| (12) | E—A/B—E, and |
| (13) | E—A—B | wherein A/B is a random copolymer of a vinyl aromatic compound and a conjugate compound and E is a copolymer of a vinyl aromatic compound and a conjugate diene compound, providing that the vinyl aromatic compound forms a gradually growing tapered block, and copolymers having repetitions of these basic backbones. The diene type polymers which are obtained by coupling such diene type polymers cited above may be also embraced.

The diene type polymers of the aforementioned general formula, A-B$_1$-B$_2$ of (4), are disclosed in JP-A-2-133,406 and those of the aforementioned formulas, B of (5) and A/B of (6), are disclosed in JP-A-1-297413.

Concerning the diene type polymers of the aforementioned general formulas, A-A/B of (7) and A-A/B-E of (8), the ratio of the vinyl aromatic compound/conjugate diene compound is desired to be in the range of 5 to 40/60 to 95% by weight, the total amount of vinyl aromatic compounds in A or A and E is preferable to be in the range of from 3 to 25% by weight, based on the amount of all the copolymers, and the vinyl bond content of the conjugate diene moiety in A/B is not less than 15% by weight, preferably from 30 to 60% by weight.

The aromatic vinyl compound and the conjugate diene compound which form the components (ii) and (iii) are the same as those cited above as usable for the component (i).

The hydrogenation products which are the components (ii) and (iii) to be used in this invention are obtained by hydrogenating the diene type polymers (random copolymer and block copolymer). The ratios of hydrogenation of the olefinically unsaturated bonds of diene type polymers are not less than 70%, preferably not less than 90%.

The method for polymerization and the method for hydrogenation of the diene type polymers to be used for the components (ii) and (iii) are disclosed in JP-A-1-275605.

The microstructure of the diene type polymers is such that the contents of such vinyl bonds as 1,2- and 3,4-are preferably not less than 10 mol %, more preferably from 20 to 80 mol %, and particularly preferably from 30 to 60 mol %, and the number average molecular weights of the diene type polymers are preferably from 5,000 to 1,000,000 and more desirably from 30,000 to 300,000.

In all the compounds which are usable as the component (II), styrene-ethyle-propylene block copolymers and styrene-ethylene-butylene block copolymers prove to be preferable. Particularly, a mixture between a styrene-ethylene-butylene block copolymer having a styrene content in the range of from 21 to 40% by weight and a styrene-ethylene-butylene block copolymer having a styrene content in the range of from 5 to 20% by weight is preferable in respect that this mixture combines outstanding transparency, flexibility, and permeability to gas.

As respects the percentage composition of the component raw materials for the composition of this invention, the proportion of the polyolefin component (I) is in the range of from 10 to 50% by weight, preferably from 15 to 50% by weight, the proportion of the hydrogenated diene type polymer component (II) in the range of from 1 to 89% by weight, preferably from 3 to 75% by weight, and the proportion of the component (III) in the range of from 1 to 89% by weight, preferably from 3 to 75% by weight. If the proportion of the polyolefin type resin is less than 10% by weight, the produced composition is deficient in heatresistance. Conversely, if this proportion exceeds 50% by weight, the composition is deficient in flexibility and permeability to gas.

If the proportion of the hydrogenated diene type polymer is less than 1% by weight, the produced composition is deficient in flexility, moldability, and permeability to gas. Conversely, if this proportion exceeds 89% by weight, the composition is deficient in heatresistance. If the proportion of the component (II) is less than 1% by weight, the produced composition is deficient in gas permeability and heatresistance. Conversely, if this proportion exceeds 89% by weight, the composition is deficient in heatresistance and transparency.

Incidentally, if the total proportion of the component (II) and the component (III) exceeds 90% by weight, the produced composition is deficient in heatresistance possibly to the extent of making the surface of the shaped article produce a viscous sensation.

The materials for use in this invention, when necessary, may be subjected to modifications such as conversion into a maleate, carboxylation, hydroxylation, epoxidization, halogenation, and sulfonation and to crosslinkings such as sulfur cross-linking, peroxide cross-linking, metal ion cross-linking, electron beam cross-linking, and silane cross-linking by any of the methods heretofore known to the art.

The molding material for the production of such medical devices as blood bags and medical tubes contemplated by this invention, when necessary, may incorporate therein such additives as are used generally for thermoplastic resins and rubbers. The additives which are effectively usable herein include antioxidants, ultraviolet absorbents, antistatic agents, flame-retardants, slip additives, foaming agents, coloring agents, seed agents, cross-linking agents, cross-linking auxiliaries, and mixtures thereof as well as plasticizers such as phthalic esters, rubber-grade softening agents, and fillers or reinforcing agents such as silica, talc, and glass fibers, for example. Further, rubbery polymers such as SBR, NBR, BR, EPT, EPR, NR, IR, 1,2-polybutadiene, AR, CR, IIR, and HSR are also available for the incorporation.

In addition, thermoplastic resins other than the components of (I) to (III), such as, for example, diene type resins, polyvinyl chloride resins, polyvinyl acetate resins, polycarbonate resins, polyacetal resins, polyamide resins, polyester type resins, polyether resins, polysulfones, and polyphenylene sulfide may be incorporated as required. The molding material comprising the components (1) to (III) mentioned above can be worked by any of the conventional kneading devices such as, for example, rubber mills, Brabender mixer, Banbury mixer, pressure kneaders, extruders, and biaxial extruders. The kneading device, without reference to the choice between the closed type and the open type, is desired to be of a type which allows displacement with an inert gas.

The kneading temperature is a temperature at which all the components to be mixed are melted. It is preferable to be generally in the range of from 170° to 250° C., preferably from 180° to 240° C. The kneading time cannot be generally discussed because it depends on the kinds and amounts of the components to be used for the composition and the kind of the kneading device to be adopted. Where a pressure kneader or a Banbury mixer is used as a kneading device, generally the kneading time is approximately in the range of from three to 10 minutes. As respects the manner of kneading, all the components to be mixed may be kneaded simultaneously or part of them may be kneaded and the resultant mixture kneaded with the rest of them.

The molding of the blood bags and medical tubes of this invention can be carried out by any of the methods heretofore known to the art such as, for example, extrusion molding, blow molding, compression molding, and calender molding.

The blood bags and medical tubes, when necessary, may be coated or metal plated.

The blood bags and medical tubes of this invention excel in various properties such as heatresistance, permeability to gas, shock resistance, moldability, pliability, low-temperature properties, temperature dependency, compatibility, resistance to hot water, elasticity, rubbery touch, and flexibility.

Now, this invention will be described more specifically below with reference to working examples. This invention needs not be limited to these working examples but may be practised otherwise without departing from the spirit of this invention.

Wherever parts and percentages are mentioned in the working examples, they are based on weight unless otherwise specified.

The various properties mentioned in the working examples are the results of determination performed by the following methods.

Tensile properties

These properties were determined in accordance with Japanese Industrial Standard (JIS) K 6301. The denomination of 100% modulus was kgf/cm$^2$, that of tensile strength on rupture kgf/cm$^2$, and that of tensile elongation on rupture %.

Gas (oxygen) permeability

This property was determined under the conditions of 23 C and 50% RH in accordance with JIS D 1434. The denomination of constant of permeability to oxygen was mm.cc/m$^2$.day.atm.

Heatresistance

This property was determined by preparing a sample measuring 2 mm in thickness and the square of 2 cm in surface area, allowing the sample to age in a gear oven at 120° C. for 30 minutes, examining the aged sample as to the degree of shrinkage produced thereon in consequence of the aging, and evaluating this degree on a three-point scale, wherein o is shrinkage of not more than 3%, Δ is shrinkage of more than 3% and not more than 6%, and x is shrinkage of more than 6%.

Vicart softening point

This property was determined under a load of 1 kg in accordance with ASTM D 1525. The denomination of softening point was °C.

Transparency

A sample sheet about 0.4 mm in thickness was tested for haze by the use of a muntiple light source spectro-colorimeter made by Suga Shikenki K.K. The transparency determined by this method increases in proportion as the numerical value of the outcome of the test decreases.

Softness

A roughly rectangular bag measuring 100 mm×150 mm in inside dimensions was formed by heat-sealing a sample sheet 200 in thickness, filled with 80 ml of 50% (V/V)% glycerol, subjected to centrifugation with a centrifugal separator (produced by Hitachi Limited and marketed under product code of "CR-25H") at 5,000 xg at 22° C. for 20 minutes, then examined as to the occurrence of irreversible deformation and rupture, and evaluated on the three-point scale, wherein "absence" stands for absence of irreversible deformation, "presence" for presence of irreversible deformation, and "presence of rupture" for presence of both irreversible deformation and rupture.

Referential Example 1

Various polymers which were used for formulations in working examples and controls were as follows.

PP

Polypropylene (produced by Mitsubishi Petrochemical Industries Ltd. and marketed under trademark designation of "Polypropylene MA-8").

PE

Polyethylene (produced by Mitsubishi Petrochemical Co., Ltd. and marked under trademark designation of "Polyethylene YK-30")

CDC1 TO CDC3

Hydrogenated diene type polymers (E-EB type TPE) obtained by hydrogenating butadiene moieties of block copolymers consisting of a polybutadiene segment having a low 1,2-vinyl bond content and a polybutadiene segment having a high 1,2-vinyl bond content, invariably produced by Japan Synthetic Rubber Co., Ltd. The microstructures, number average molecular weights, and ratios of hydrogenation of these CDC1 to 3 are as shown in Table 1.

TABLE 1

| | 1,2-vinyl bond content in block C (%) | 1,2-vinyl bond content in block D (%) | Number average molecular weight C/D/C (× 103) | Hydrogenation ratio (%) |
| --- | --- | --- | --- | --- |
| CDC 1 | 12 | 45 | 30/140/30 | 98 |
| CDC 2 | 13 | 80 | 60/120/60 | 97 |
| CDC 3 | 10 | 56 | 25/200/25 | 98 |

SBS

Polystyrene-polybutadiene-polystyrene block copolymer (produced by JSR Shell Elastomer K.K. and marketed under product code of "TR2000").

SIS

Polystyrene-polyisoprene-polystyrene block copolymer (produced by JSR Shell Elastomer K.K. and marketed under product code of "SIS 5000").

SEBS

Block copolymer obtained by hydrogenating polybutadiene moiety of polystyrene-polybutadiene-polystyrene block copolymer (produced by Shell Chemical K.K. and marketed under product code of Clayton G1650 for SEBS-1 and product code of Clayton G1657 for SEBS-2).

SEPS

Block copolymer obtained by hydrogenating polyisoprene moiety of SIS (produced by Kuraray Ltd. and marketed under trademark designation of "Septon 2002").

EXAMPLES 1 to 13 AND CONTROLS 1 to 7

A sheet 0.4 mm in thickness was produced by feeding a varying set of components according to a varying formula shown in Table 2 to a T-die extruding device adjusted to a temperature of 210° C. and kneading and extruding them at a rate of 60 rpm. A blood bag was made of this sheet, filled with blood, centrifuged for separation of blood components, and examined to determine occurrence of fructure. The test of this blood bag for physical properties was conducted by using a test piece cut from a sheet used as the material of the bag. The results are shown in Tables 2 to 4.

As clearly noted from Tables 2 to 4, Examples 1 to 13 produced materials which conformed to this invention as evinced by the fact that the bags made of these materials excelled in such properties as heatresistance, tensile properties, transparency, and flexibility as well as in oxygen permeability and withstood the impact of centrifugal separation without sustaining either irreversible deformation or rupture. In contrast, Control 1 represents a case in which the material had a polyolefin type resin {component (I)} content less than the lower limit of the range contemplated by this invention and, therefore, was deficient in heatresistance as evinced by the fact that the bag made of this material sustained irreversible deformation and rupture under the impact of centrifugal separation. Control 2 represents a case in which the material had a polyolefin type resin {component (I)} content exceeding the upper limit of the range contemplated by this invention and, therefore, was deficient in permeability to oxygen and flexibility. Control 3 represents a case in which the material omitted the use of a hydrogenated diene type polymer {component (D)} and, therefore, was deficient in heatresistance, transparency, and flexibility and the bag made of the material sustained irreversible deformation under the impact of centrifugal separation. Control 4 represents a case in which the material omitted the use of the component (III) and, therefore, was slightly deficient in heatresistance in spite of excellence in permeability to oxygen and flexibility. Control 5 represents a case in which the material had the component (II) content exceeding the upper limit of the range contemplated by this invention and, therefore, was deficient in heatresistance and the bag made of the material sustained irreversible deformation and rupture under the impact of centrifugal separation. Control 6 represents a case in which the material had the component (III) content exceeding the upper limit of the range contemplated by this invention and was deficient in heatresistance and the bag made of this material sustained irreversible deformation under the impact of centrifugal separation. Control 7 represents a case in which the bag was a commercially available product made of flexible vinyl chloride and was deficient in oxygen permeability and mechanical strength.

TABLE 2

|  |  | Example | | | | | |
|---|---|---|---|---|---|---|---|
|  |  | 1 | 2 | 3 | 4 | 5 | 6 |
| Formulation | | | | | | | |
| (I) | ; PP | 10 | 10 | 10 | 30 | 30 | 30 |
|  | PE | — | — | — | — | — | — |
| (II) | ; CDC 1 | 20 | 50 | 70 | 20 | 50 | — |
|  | CDC 2 | — | — | — | — | — | 40 |
|  | CDC 3 | — | — | — | — | — | — |
| (III) | ; SBS | — | — | — | — | — | 30 |
|  | SEBS-1 | 40 | 20 | 20 | 30 | 20 | — |
|  | SEBS-2 | 30 | 20 | — | 20 | — | — |
| Physical properties | | | | | | | |
| 100% Modulus | | 44 | 50 | 49 | 63 | 75 | 73 |
| Tensile strength on rupture | | 390 | 410 | 380 | 360 | 330 | 375 |
| Tensile elongation on rupture | | 660 | 635 | 660 | 560 | 575 | 590 |
| Oxygen permeability coefficient | | $4.7 \times 10^2$ | $4.4 \times 10^2$ | $4.6 \times 10^2$ | $3.8 \times 10^2$ | $3.8 \times 10^2$ | $3.9 \times 10^2$ |
| Heat resistance | | △ | △ | △ | ◯ | ◯ | ◯ |
| Viscat softening point | | 70 | 63 | 60 | 75 | 78 | 75 |
| Transparency | | 20 | 24 | 29 | 20 | 30 | 28 |
| Flexibility | | 78 | 79 | 78 | 83 | 89 | 87 |
| Deformability under impact of centrifugal separation | | no | no | no | no | no | no |

TABLE 3

|  |  | Example | | | | | | |
|---|---|---|---|---|---|---|---|---|
|  |  | 7 | 8 | 9 | 10 | 11 | 12 | 13 |
| Formulation | | | | | | | | |
| (I) | ; PP | 50 | 50 | 50 | 30 | — | — | 50 |
|  | PE | — | — | — | — | 20 | 50 | — |
| (II) | . CDC 1 | 10 | 40 | — | — | 30 | 20 | 20 |
|  | CDC 2 | — | — | — | 30 | — | — | — |
|  | CDC 3 | — | — | 40 | — | — | — | — |
| (III) | ; SIS | — | — | 30 | — | — | — | — |
|  | SEBS-1 | 20 | 10 | — | — | 30 | 30 | 20 |
|  | SEBS-2 | 20 | — | — | — | 20 | — | 10 |
|  | SEPS | — | — | — | 40 | — | — | — |
| Physical properties | | | | | | | | |
| 100% Modulus | | 85 | 90 | 88 | 73 | 60 | 70 | 90 |
| Tensile strength on rupture | | 390 | 405 | 410 | 345 | 380 | 375 | 420 |
| Tensile elongation on rupture | | 360 | 355 | 400 | 550 | 750 | 490 | 330 |
| Oxygen permeability coefficient | | $3.5 \times 10^2$ | $2.6 \times 10^2$ | $2.3 \times 10^2$ | $3.5 \times 10^2$ | $4.7 \times 10^2$ | $3.0 \times 10^2$ | $3.0 \times 10^2$ |
| Heat resistance | | ◯ | ◯ | ◯ | ◯ | ◯ | ◯ | ◯ |
| Viscat softening point | | 92 | 90 | 93 | 81 | 72 | 79 | 93 |
| Transparency | | 22 | 30 | 28 | 27 | 23 | 33 | 35 |
| Flexibility | | 92 | 93 | 92 | 89 | 76 | 89 | 95 |
| Deformability under impact of centrifugal separation | | no | no | no | no | no | no | no |

TABLE 4

|  |  | Example 1 | Example 2 | Example 3 | Example 4 | Example 5 | Example 6 | Example 7 |
|---|---|---|---|---|---|---|---|---|
| Formulation |  |  |  |  |  |  |  |  |
| (I) | ; PP | 5 | 60 | 30 | 30 | 10 | 10 | flexible vinyl chloride resin Conrention product |
|  | PE | — | — | — | — | — | — | |
| (II) | ; CDC 1 | — | — | — | — | — | — | |
|  | CDC 2 | — | — | — | — | 90 | — | |
|  | CDC 3 | 50 | 20 | — | 70 | — | — | |
| (III) | ; SBS | — | — | — | — | — | — | |
|  | SEBS-1 | 45 | 20 | 70 | — | — | 90 | |
| Physical properties |  |  |  |  |  |  |  |  |
| 100% Modulus |  | 45 | 123 | 79 | 70 | 45 | 50 | 93 |
| Tensile strength on rupture |  | 340 | 473 | 360 | 385 | 330 | 350 | 247 |
| Tensile elongation on rupture |  | 730 | 250 | 565 | 580 | 750 | 650 | 420 |
| Oxygen permeability coefficient |  | $6.0 \times 10^2$ | $1.9 \times 10^2$ | $3.1 \times 10^2$ | $3.8 \times 10^2$ | $6.2 \times 10^2$ | $6.1 \times 10^2$ | $2.0 \times 10^2$ |
| Heat resistance |  | X | ○ | X | △ | X | X | ○ |
| Viscat softening point |  | 42 | 101 | 79 | 73 | — | 45 | — |
| Transparency |  | 70 | 45 | 75 | 29 | 23 | 28 | — |
| Flexibility |  | 68 | 99 | 94 | 87 | 80 | 83 | — |
| Deformability under impact of centrifugal separation |  | yes bag breakage | yes | yes | yes | yes bag breakage | yes | yes |

EXAMPLE 14 AND CONTROL 8

Test bags of Example 14 and Control 8 having inside dimensions of 115 mm × 135 mm were produced respectively of a sheet obtained by molding the composition of Example 4 shown in Table 2 in a thickness of 200 μm and a sheet obtained by molding the composition of Control 7 shown in Table 4 in a thickness of 400 μm.

Commercially available blood bags were filled with blood taken in a fixed volume of 400 ml respectively from 10 healthy men (volunteers) and then subjected to centrifugal separation with a centrifugal separator (PR-6000, IEC) at 375 xg for 20 minutes to collect platelet rich plasma in the supernatant layers in the blood bags. The portions of platelet rich plasma obtained in the ten blood bags were transferred into five test bags each of the two species mentioned above. Platelet pellets were obtained by centrifuging the platelet rich plasma samples in these test bags at 1,500 xg for 20 minutes thereby inducing sedimentation of platelets therein. Of the platelet poor plasma in the supernatant layer formed in consequence of centrifugal separation severally in the test blood bags, 50 ml was left behind and the rest was transferred to other container.

The platelet pellets were left standing at normal room temperature for one hour and then stirred gently to induce resuspension and obtain a platelet concentrate (PC).

Concentration of platelets in the PC's was measured using an automatic blood cell counter (produced by Toa Iyodenshi K.K. and marketed under trademark designation of "SYSTEM NE-6000"). The ratios of dilution were calculated from the results of the counting. The contents of the counting blood bags were diluted by addition thereto of proportionately necessary amounts of platelet deficient plasma previously transferred to the other container in the preceding procedure so that the platelet concentrations thereof would reach 4, 8, 12, 16, and $20 \times 10^5$ cells/μl. Of the PC' whose volumes were increased in consequence of the dilution mentioned above, 50 ml was left behind in the test blood bag and the excess was withdrawn therefrom.

In consequence of the dilution and the extraction described above, there were obtained PC' containing 2, 4, 6, 8, and $10 \times 10^{10}$ platelets per bag.

Each PC was set horizontally on a shaking stand (NR-30, TAITEC) and horizontally reciprocated with a stroke of 30 mm thereon at a rate of 60 reciprocations/minute as kept at 22° C.

After 24 hours shaking, part of the PC was extracted as a sample and tested for partial pressure of oxygen by the use of a blood gas analyzing device (ABL-30, RADIOMETER). The results are shown in FIG. 1.

It is clearly noted from FIG. 1 that the partial pressure of oxygen of the PC after 24 hours preservation decreased in proportion as the number of platelets increased. In the test blood bags of Control 8, the partial pressure of oxygen decreased sharply as compared with that observed in the test blood bags of Example 14. In the region exceeding about $7 \times 10^{10}$ cells/bag, the partial pressure of oxygen was constant at 20 mmHg without reference to a change in the number of platelets. In this region, the supply of oxygen to the platelets was not sufficient and the platelets succumbed to irreversible loss of function. From the data, it is concluded that the largest number of platelets safely preservable in the test blood bags of Control 8 was about $7 \times 10^{10}$ cells/bag. In contrast, the test blood bags of Example 14 conforming to this invention were still capable of supplying oxygen even when they contained $10 \times 10^{10}$ platelets per bag. By the extrapolation of the rectilinear segment in the graph, the largest number of preservable platelets is found to be about $18 \times 10.10$ cells/bag, indicating that the capacity of these blood bags for platelets was about 2.6 times that of the conventional blood bags which were made of soft vinyl chloride (Control 6).

We claim:

1. A medical device produced by molding a composition comprising: (I) 10 to 50% by weight of a polyolefin resin; (II) 1 to 89% by weight of a hydrogenated diene polymer obtained by hydrogenating not less than 90 mol % of a butadiene moiety of a linear or branched copolymer consisting of a polybutadiene block segment (C) having a 1,2-vinyl bond content of not more than 20 mol % and a block segment (D) of polybutadiene whose butadiene moiety has a 1,2-vinyl bond content in the range of from 25 to 95 mol % and having a block structure represented by C-(D-C)$_n$ or (C-D)$_m$, wherein n stands for an integer of at least 1 and m for an integer of at least 2; and (III) 1 to 89% by weight of at least one member selected from the group consisting of (i) a block copolymer comprised of a polymer block having a vinyl aromatic compound as a main component thereof and a polymer block having a conjugate diene compound as a main component thereof, (ii) a hydrogenated random copolymer of a vinyl aromatic compound and a conjugated diene compound, and (iii) a hydrogenated block copolymer composed of a polymer block having a vinyl aromatic compound as a main component thereof and a polymer block having a conjugate diene compound as a main component thereof, wherein the sum of (I)+(II)+(III) is 100% by weight.

2. A medical device according to claim 1, wherein said composition comprises (I) 15 to 50% by weight of said polyolefin type resin, (II) 3 to 75% by weight of said hydrogenated diene type polymer, and (III) 3 to 75% by weight of said block copolymer or a hydrogenation product thereof.

3. A medical device according to claim 1, wherein the proportions of said block C and said block D forming said hydrogenated diene type polymer are 5 to 90% by weight of said block C and 95 to 10% by weight of said block D.

4. A medical device according to claim 1, wherein said polyolefin resin is a polymer of ethylene, propylene and 4-methyl-1-pentene.

5. A medical device according to claim 4, wherein said polyolefin resin is polypropylene.

6. A medical device according to claim 1, wherein said vinyl aromatic compound is styrene or α-methyl styrene.

7. A medical device according to claim 1, wherein the weight average molecular weight of said block C and that of said block D are both not less than 5,000.

* * * * *

UNITED STATES PATENT AND TRADEMARK OFFICE
CERTIFICATE OF CORRECTION

PATENT NO. : 5,264,488
DATED : November 23, 1993
INVENTOR(S) : Motokazu TAKEUCHI etal It is certified that error appears in the above-indentified patent and that said Letters Patent is hereby corrected as shown below:

Abstract last line, kindly delete "(1)+(R)+(III)" and insert -- (I)+(II)+(III) --.

In Column 8, line 30, delete "(1)" and insert -- (I) --.

In Column 11, line 12, delete "(1)" and insert -- (I) --.

In Column 14, line 68, delete "comprised" and insert -- composed --.

Signed and Sealed this

Thirty-first Day of May, 1994

*Attest:*

BRUCE LEHMAN

*Attesting Officer*     *Commissioner of Patents and Trademarks*